United States Patent [19]

Gerard

[11] Patent Number: 5,108,805
[45] Date of Patent: Apr. 28, 1992

[54] MULTILAYER DECORATIVE COMPOSITE, SUBSTANTIALLY OF A THERMOSHRINKING THERMOPLASTIC MATERIAL, FOR PACKAGING, PROCESS FOR APPLYING SUCH A COMPOSITE AND PACKAGING THUS OBTAINED

[75] Inventor: Jean Gerard, Sarrebourg, France

[73] Assignee: Raymond Morin, S.A., Sarrebourg, France

[21] Appl. No.: 249,171

[22] PCT Filed: May 4, 1987

[86] PCT No.: PCT/FR87/00147
§ 371 Date: Nov. 9, 1988
§ 102(e) Date: Nov. 9, 1988

[87] PCT Pub. No.: WO88/08815
PCT Pub. Date: Nov. 17, 1988

[51] Int. Cl.⁵ ............................................. B65D 25/36
[52] U.S. Cl. ................................. 428/34.9; 215/12.2; 428/35.7; 428/200
[58] Field of Search ............... 428/34.9, 35.7, 200; 215/12.2

[56] References Cited

U.S. PATENT DOCUMENTS

| 4,190,168 | 2/1980 | Jacques | 428/34.9 |
| 4,608,284 | 8/1986 | Roales | 428/34.9 |
| 4,755,403 | 7/1988 | Ferguson | 428/34.9 |
| 4,844,957 | 7/1989 | Hoffman | 428/34.9 |

FOREIGN PATENT DOCUMENTS

| 2111898 | 6/1972 | France . |
| 2501397 | 9/1982 | France . |
| 1453540 | 10/1976 | United Kingdom . |

*Primary Examiner*—James J. Seidleck
*Attorney, Agent, or Firm*—Young & Thompson

[57] ABSTRACT

A multilayer decorative composite, essentially of thermoplastic thermoshrinkable material, for packaging, and a process for applying such composite. The container carries on its outer surface a film of thermoplastic thermoshrinkable material of coefficient of shrinkage substantially identical to that of the plastic material of the body of the container, so that it remains intimately thermally bonded to the walls of the container during shrinkage of these latter at the time of cooling, for example after thermoforming.

4 Claims, 2 Drawing Sheets

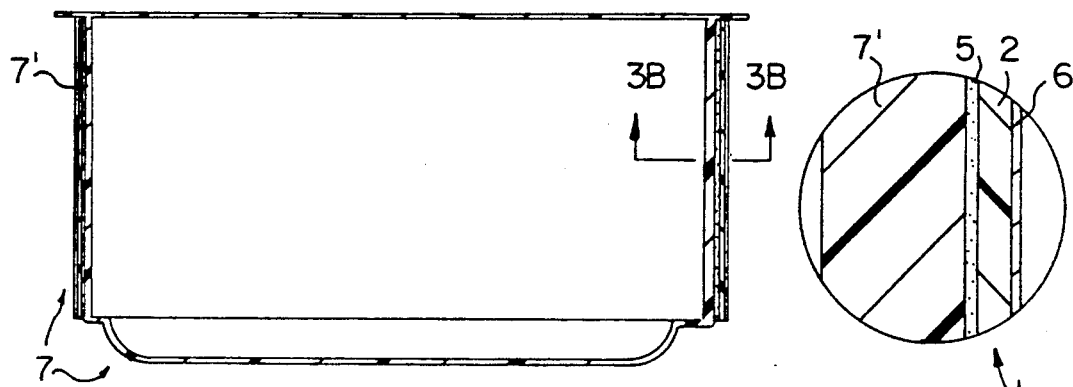
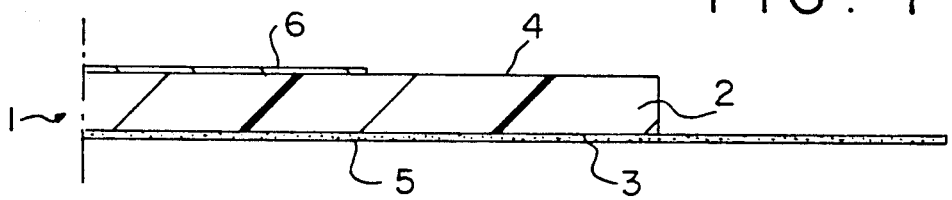
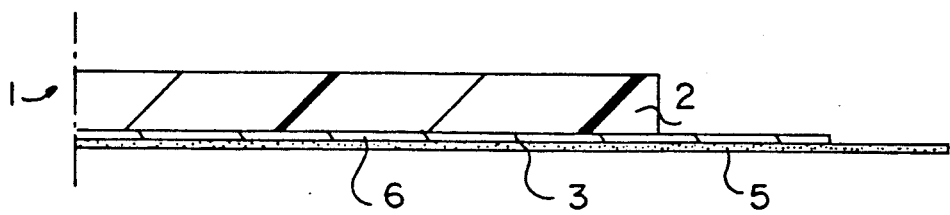

MULTILAYER DECORATIVE COMPOSITE, SUBSTANTIALLY OF A THERMOSHRINKING THERMOPLASTIC MATERIAL, FOR PACKAGING, PROCESS FOR APPLYING SUCH A COMPOSITE AND PACKAGING THUS OBTAINED

The present invention relates to a multilayer decorative composite for packaging, particularly of food products, whose rigid or semi-rigid multilayer walls are made by thermoforming, the external layer of the packaging being of thermoplastic material and being overlaid on all or a portion of the composite by thermofastening.

Such packages are generally made by treatment machines of the form-fill-seal type. The mono or multilayer thermoplastic polymeric or copolymeric sheets are thermoformed. During this thermoforming, which is conducted at a temperature of about 150° C., the decorative composite adheres to the external surface of the outer walls of the packaging thanks to overlaying. When the rigid or semi-rigid walls of the packaging are very thin, which is to say between 100 and 200μ, the packaging cools very rapidly, does not contract, and the paper remains intimately bonded to the walls. These very thin walls may be single layer (for example a layer of polystyrene) or multilayer (for example polystyrene/barrier layer/polyethylene). The decorative composite itself may be constituted either by bleached layered kraft paper of 90 to 115 g/m², whose layered surface is adapted to be printed, the other face being covered by a thermofusible (hot melt) of 10 to 18 g/m² thermobonded to polystyrene, either of an aluminum composite, for example 7 to 9μ, bonded to kraft paper of 80 to 115 g/m², the aluminum surface being adapted to be printed and the kraft paper being covered by a thermofusible (hot melt) thermobonding to polystyrene.

At present, when the walls of the packaging are very thin, the decorative composite also stiffens the whole of the package.

It had been proposed to provide packages having walls much thicker, up to 700μ, or even more. This is necessary, for example, for packages in the form of a tray adapted to be reheated in microwave ovens and containing for example cooked dishes or the like. The walls should be thick, so that the packaging keeps a certain shape during cooking. They are normally multilayer, the external layer being of thermoplastic material such as polypropylene among others. Moreover, the thick multilayer walls of course have the characteristic of remaining hot for a long time and of contracting upon cooling.

Thus, the conventional decorative composite of kraft paper or of aluminum/kraft paper thermosealed to the thermoform progressively separates from the packaging during cooling, either after thermosealing or after reheating of the package, for example in a microwave oven. This partial delamination of the composite accordingly results in the formation of blisters at the level of the decoration and of course detracts from the overall appearance of the decoration and therefore of the packaging (see FIG. 1 of the accompanying drawings).

Moreover, the kraft paper-base decorations have a very low resistance to humidity and problems of blistering frequently arise after storage in a cooled chamber, or after contact with water during cleaning.

Finally, these decorations covered by a substantial layer of thermofusible (hot melt) material frequently leave a deposit of this product on the treatment machine, which requires frequent stoppage for cleaning.

The general problem solved by the present invention therefore consists in providing a decorative composite, adapted to be applied on all or a part of the rigid or semi-rigid thin walls of the packaging whose external layer is of thermoplastic material, and which has a coefficient of contraction such that it will be remain intimately bonded to the walls of the packaging during contraction of these latter due to any kind of cooling, for example after thermoforming or after placing the package in an oven, so as to avoid blisters at the level of the decoration and to improve the general appearance of the packaging assembly.

Moreover, this composite should have high resistance to humidity and avoid frequent stoppage of the treatment machine for cleaning.

The invention thus has for its object a multi-layer decorative composite for packaging, particularly for food products, whose rigid or semi-rigid multilayer walls are produced by thermoforming, the external layer of the packaging being of thermoplastic material and being overlaid on its external surface wholly or partially of said composite by thermobonding, the composite being characterized in that it is constituted essentially by a film of thermoplastic thermoretractible material of a shrinkage coefficient substantially identical to that of the packaging, such that it remains intimately thermobonded to the walls of the packaging during contraction of these latter during cooling, for example after thermoforming.

The invention will be better understood thanks to the following description, which relates to a preferred embodiment, given by way of non-limiting example, and explained with reference to the accompanying schematic drawings, in which:

FIG. 3A is an elevational view of packaging in the form of a tray provided with a composite according to the invention;

FIG. 3B is an enlarged cross sectional view taken on the line 3B—3B of FIG. 3A;

FIG. 4 is an enlarged cross sectional view, of a first modification of the composite according to the invention, and FIG. 5 is an enlarged cross sectional view, of a second modification of the composite according to the invention.

According to the invention, the composite 1 is constituted essentially by a film of thermoplastic material 2 which is thermoshrinkable and has a coefficient of shrinkage substantially identical to that of the packaging, such that it remains intimately thermobonded to the walls 7 of the packaging during contraction of these latter upon cooling, for example after thermoforming.

Figure 1A:
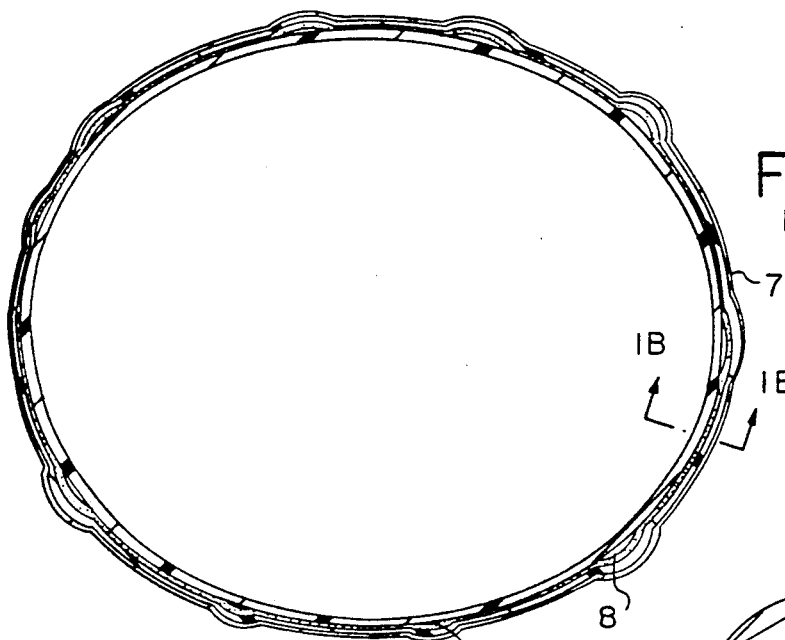
FIG. 1A is a plan view of packaging in the form of a tray with thick walls after contraction due to cooling, provided with a composite according to the prior art.
Figure 1B:
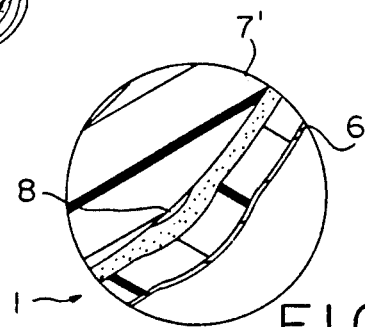
FIG. 1B is an enlarged fragmentary cross sectional view taken on the line 1B—1B of FIG. 1A.
Figure 2A:
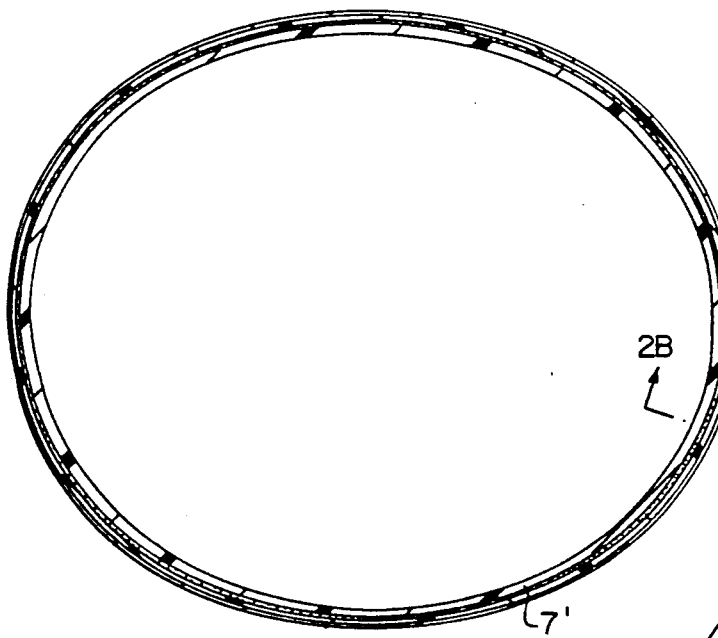
FIG. 2A is a plan view of packaging in the form of a tray with thick walls after contraction due to cooling, provided with a composite according to the prior art.
Figure 2B:
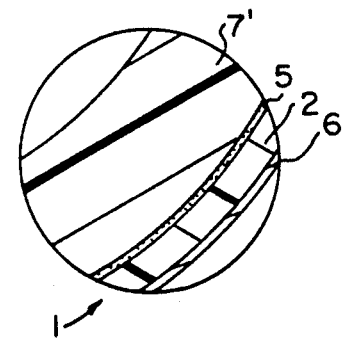
FIG. 2B is an enlarged cross sectional view taken on the line 2B—2B of FIG. 2A.

As can be seen in FIGS. 2A, 2B, 3A, 3B and 4, and according to a first embodiment of the invention, the film 2 is a transparent, opaque or metallized thermoplastic film whose one face 3 is covered with a layer of hot melt 5 either of an overlay or of extruded or coextruded polymer, the other surface 4 being covered by printing 6.

According to a second embodiment of the invention, and as seen in FIG. 5, the film 2 is a transparent thermoplastic film whose one surface 3 is covered with printing 6, itself covered by a hot melt layer of overlay 5.

The hot melt layer 5 may be in the form of a shellac or an emulsion or a dispersion or a thermofusible material of 5 to 6 g/m$^2$, preferably based on ethylvinylacetate.

As to the thermoplastic film 2 itself, it can be mono or multilayer, each layer being of a different polymer or copolymer, for example polystyrene, polypropylene, polyester, polyesterglycol, PVC, polyethylene, etc. Its thickness is between 40 and 200μ, as a function of the coefficient of contraction and of the rigidity of the thermoplastic material selected for said film 2. Thus, if it is thinner, it is in danger of crumpling. If it is thicker, it may be difficult to position during forming in the form-fill-thermoseal machine.

Of course, this composite may have different forms. It could for example be in the form of a band or strip covering the lateral walls 7' of the packaging. The decoration printed on the composite could for example indicate the nature of the product, its trademark, its origin, its composition, its weight, advertising, etc.

Such a composite 1 permits obtaining an excellent hot behavior at the level of the hot tack. As previously indicated, this is necessary to avoid blisters 8 which would inevitably form upon cooling, particularly after thermoforming or after introduction into the oven (see FIGS. 2A, 2B, 3A and 3B).

Moreover, such a composite 1 offers improved protection of the packaging. Finally, it permits increasing the output of the treatment machines of the form-fill-seal type because it is no longer necessary to clean them as often to avoid deposit of hot melt due to the high proportion of paraffin or wax which it contains.

The present invention also has for its object a process for positioning the composite according to the invention on all or a part of the packaging, characterized in that it consists in positioning the composite 1 in the interior of the molds of a treatment machine of the form-fill-seal type, molds adapted to perform thermoforming of the sheets particularly of thermoplastic comprising the different walls 7 of the packaging, then to effect the thermoforming, its temperature producing at the same time the thermobonding of the sealing layer 5 of the composite 1 on the walls 7 of the packaging.

Finally, the present invention also has for its object a package, particularly of food products, of which all or part of the outer surface of the external rigid or semi-rigid multilayer walls are covered by a multilayer decorative composite 1 according to the invention.

This package could be, as previously indicated, in the form of a tray whose side walls 7' are provided with the composite 1 according to the invention in the form of a band or strip.

Of course the invention is not limited to the embodiment described and shown in the accompanying drawings. Modifications remain possible, particularly as to the construction of the various elements, or by substitution of technical equivalents, without thereby departing from the scope of protection of the invention.

I claim:

1. A container comprising a hollow body of thermoplastic material covered over its external surface at least partially by a thermobonding layer and a thermoplastic film over the thermobonding layer and secured to the container by said thermobonding layer, and printing on one side of said thermoplastic film, said printing being visible from outside the container, both the container and the thermoplastic film having a coefficient of shrinkage upon cooling, both said coefficients being substantially the same.

2. A container as claimed in claim 1, in which the thermoplastic film is transparent and the printing is between the thermoplastic film and the thermobonding layer.

3. A container as claimed in claim 1, said thermobonding layer having a weight of 5 to 6 g/m$^2$.

4. A container as claimed in claim 1, said thermoplastic film having a thickness between 40 and 200μ.

* * * * *